200,424
Patented Sept. 8, 1959

2,903,424
TREATMENT OF WOOL SCOURING WASTE

Willie Fong, Richmond, Calif., assignor to the United States of America as represented by the Secretary of Agriculture No Drawing. Application September 14, 1954
Serial No. 456,084

1 Claim. (Cl. 210—43)

(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention concerns the treatment of wool scouring waste liquor, that is, the liquid which has been used to remove grease, suint salts, dirt and other objectionable material from raw wool. The objects of this invention includes the provision of procedures whereby such waste liquor is treated for the purpose of recovering grease therefrom and to clarify the liquor so as to drastically reduce its pollutional characteristics.

It is well known in the art that raw wool cannot be used directly for textile operations but must first be scoured to remove the impurities present therein. Generally speaking, these impurities may be classified into two broad categories, (1) acquired impurities, such as earthy material, sand, vegetable matter, faecal matter, paint, tar, etc. and (2) the natural impurities secreted by the animal. The natural impurities consist of two major components (a) wool suint, being the dried water-soluble material secreted by the sweat glands of the animal and consisting mostly of potassium salts of fatty acids and (b) wool grease, a complex water-insoluble mixture of fats and oils secreted by the sebaceous glands of the animal.

The scouring of raw wool is commonly carried out by agitating the wool in an alternating series of bowls and squeeze rolls with an aqueous solution of soap, or other detergent, and soda ash. The spent liquor from the scouring process is a foul-smelling material, the disposal of which is a continuing problem in the industry. Because of its high content of grease and other organic materials the waste if discharged directly into a stream will cause destruction of marine life and pollution of the stream.

The generally used method of clarifying the waste liquor is the acid-cracking method which involves acidifying the liquor with sulphuric acid and thereafter settling the acidified material. By this procedure some of the grease and other solids are separated and the treated liquor is reduced in organic content. However, the treated liquor still contains so much organic matter that its disposal still presents pollution problems.

It has now been found that by applying colloid bentonite in conjunction with acidification a much greater percentage of grease can be separated and the resulting clarified liquor has a considerably lower oxygen demand. The procedure in accordance with this invention involves forming a mixture of the waste wool-scouring liquor and colloidal bentonite at a pH of about 3 to 6, this pH being obtained, for example, by acidifying the waste liquor with sulphuric, hydrochloric, phosphoric, or other acid. Thereafter, the sludge is separated from the resulting clarified liquor. Preferably, enough of the acid is first added to the waste liquor to reduce the pH to about 3 to 6, optimum results usually being achieved with a pH of about 3 to 3.5. Into the acidified mixture is then incorporated an aqueous dispersion of colloidal bentonite. The amount of bentonite will vary depending on such factors as the amount of organic material in the waste, the amount of suspended material, etc. Usually a proportion of bentonite of about 0.1 to 0.5% (based upon the weight of the waste liquor) will give good results. The mixture of waste, acid, and bentonite is preferably allowed to stand for several hours then subjected to centrifugation or filtration to separate the grease and dirt-containing sludge from the clarified liquor.

If desired, the sequence of adding acid and bentonite may be reversed but generally best results are obtained when the waste liquor is acidified prior to adding the bentonite.

The treatment is generally conducted at room temperature as being the most convenient and giving optimum results. Usually the waste liquor as it comes from the scouring process has a temperature of around 130° F. The treatment can be conducted at this temperature; however it is preferred to first cool the liquor to approximately room temperature before addition of acid and bentonite.

It is to be noted that the bentonite used in the present process is a form of bentonite known as colloidal or dispersible. The particles of the material are so minute that they exhibit colloidal properties and can be dispersed in water just like other colloids to prepare colloidal solutions which exhibit Brownian movement and other typical colloid phenomena. It has been observed that grades or types of bentonite which are not made up of colloidal particles cannot be used, since they do not yield the desired results of increasing grease recovery and increasing clarity of the separated liquid. Likewise it has been observed that conventional filter aid materials such as diatomaceous earth, kaolinite, fuller's earth, etc. do not yield results comparable with those obtained with colloidal bentonite in that filter aids do not significantly increase recovery nor significantly increase the clarification effect obtained with the acid treatment alone.

The reason why colloidal bentonite exhibits a synergistic effect on the clarification of the waste liquor is not completely understood. It is believed that one reason for its activity is that the grease particles in the liquor are strongly adsorbed on the surface of the colloidal particles of bentonite. However such action would be expected from other materials such as diatomaceous earth, fuller's earth, kaolinite, etc. so that it cannot be explained why colloidal bentonite is so much more effective than these other agents. Regardless of any theoretical considerations, it has been demonstrated that colloidal bentonite does act to produce a clarified liquor of lesser organic content than is otherwise obtainable.

The invention is further demonstrated by the following examples:

Raw wool was scoured with an aqueous solution containing 0.1% sodium oleate and 0.3% sodium carbonate. The scouring liquor was applied at 130° F. in the proportion of 1 gallon per pound of raw wool.

The spent scouring liquor was separated from the scoured wool, cooled to room temperature, then acidified by adding sulphuric acid. Different samples of the liquor were acidified to different pH levels as indicated below. The acidified liquor was then treated with a measured amount of colloidal bentonite (as set forth below), the mixture allowed to stand for 2 hours then centrifuged to separate the sludge from the clarified liquid. In several of the runs (1 and 5) no bentonite was added thus to furnish comparative data. In these cases the acidified liquor was allowed to stand 2 hours then centrifuged.

The turbidity of the clarified liquid was determined with a spectrophotometer measuring the amount of light (1000 mμ) absorbed by the liquid. The units used are arbitrary and based on a turbidity of zero for distilled water.

The chemical oxygen demand (c.o.d.) of the clarified liquid was obtained in the usual way by determining the amount of oxygen consumed from potassium permanganate.

Grease content of the clarified liquid was determined by reducing the liquid to dryness and extracting with chloroform.

The colloidal bentonite used in these experiments had the following particle size distribution:

96 to 97% finer than 44 microns
93 to 94% finer than 5 microns
87 to 89% finer than 0.5 micron
60 to 65% finer than 0.1 micron The results obtained are tabulated below:

It is evident from the above data that the treatment of the waste liquor with both acid and bentonite gave far better results than could be obtained with acid alone. For example, in run 5 wherein acid treatment only was applied, the c.o.d. of the waste was reduced by 64% and the grease content of the waste was reduced by 79%. In run 8 wherein the liquor was acidified to the same pH level and treated with 0.5% of bentonite the c.o.d. was reduced by 88% and the grease content was reduced by 96%.

Having thus defined the invention what is claimed is:

The process for clarifying an aqueous liquid containing wool grease, suint, dirt, detergent, and alkali which comprises acidifying the liquid to a pH of about 3 to 3.5, incorporating therein colloidal bentonite in a concentration of about 0.2 to 0.3%, and thereafter separating the sludge from the clarified liquor.

| | Treatment conditions | | Properties of clarified liquid | | | | | |
|---|---|---|---|---|---|---|---|---|
| Run No. | pH | Concentration of bentonite, percent | Turbidity | c.o.d., p.p.m. | Reduction in c.o.d., percent | Grease, p.p.m. | Reduction in grease content, percent | Total solids, p.p.m. |
| | [1] 9.6 | Untreated waste. | over 15 | 9,000 | | 27,700 | | 36,700 |
| 1 | 4.8 | 0 | over 15 | 5,450 | 40 | 11,900 | 57 | 22,600 |
| 2 | 4.8 | 0.1 | over 15 | 4,925 | 45 | 10,300 | 63 | 15,000 |
| 3 | 4.8 | 0.3 | 13.0 | 3,950 | 56 | 6,000 | 78 | 14,700 |
| 4 | 4.9 | 0.5 | 11.2 | 3,475 | 61 | 4,700 | 83 | 14,200 |
| 5 | 3.3 | 0 | 11.7 | 3,250 | 64 | 5,800 | 79 | 22,600 |
| 6 | 3.3 | 0.1 | 1.41 | 2,100 | 77 | 1,000 | 96 | 15,000 |
| 7 | 3.2 | 0.3 | 0.26 | 1,350 | 85 | 800 | 97 | 14,700 |
| 8 | 3.2 | 0.5 | 0.15 | 1,100 | 88 | 1,000 | 96 | 14,200 |

[1] The figures in this line represent the properties of the waste liquor without any treatment.

References Cited in the file of this patent

UNITED STATES PATENTS

| | | |
|---|---|---|
| 1,170,868 | Bachler | Feb. 8, 1916 |
| 1,757,526 | Hedgepeth | May 6, 1930 |
| 2,261,919 | Pittman et al. | Nov. 4, 1941 |
| 2,261,924 | Pittman et al. | Nov. 4, 1941 |
| 2,345,827 | Olin | Apr. 4, 1944 |
| 2,421,094 | Totney | May 27, 1947 |
| 2,692,184 | Cabot et al. | Oct. 19, 1954 |
| 2,719,118 | Bernard | Sept. 27, 1955 |

FOREIGN PATENTS

| | | |
|---|---|---|
| 508,371 | Great Britain | June 29, 1939 |

OTHER REFERENCES

Rudolfs: "Industrial Wastes," New York, Reinhold, 1953, pp. 172–178.

Turner: "Condensed Chemical Dictionary," 4th ed., New York, Reinhold, 1950, page 89.